United States Patent [19]
Dice et al.

[11] Patent Number: 6,141,794
[45] Date of Patent: Oct. 31, 2000

[54] SYSTEM AND METHOD FOR SYNCHRONIZING ACCESS TO SHARED VARIABLES IN A VIRTUAL MACHINE IN A DIGITAL COMPUTER SYSTEM

[75] Inventors: David Dice, Foxboro; Ronald J. Mann, Concord; Robert G. Vandette, North Andover, all of Mass.

[73] Assignee: Sun Microsystems, Inc., Palo Alto, Calif.

[21] Appl. No.: 09/174,278

[22] Filed: Oct. 16, 1998

[51] Int. Cl.[7] ........................................................ G06F 9/45
[52] U.S. Cl. .................................. 717/5; 717/6; 709/102; 709/400
[58] Field of Search .................................... 717/1, 2, 5, 6, 717/8, 9; 707/200, 201, 202; 709/102, 213, 312, 400

[56] References Cited

U.S. PATENT DOCUMENTS

| | | | |
|---|---|---|---|
| 5,197,130 | 3/1993 | Chen et al. | 712/3 |
| 5,560,029 | 9/1996 | Papadopoulos et al. | 712/25 |
| 5,822,588 | 10/1998 | Sterling et al. | 395/704 |
| 5,961,639 | 10/1999 | Mallick et al. | 712/242 |

OTHER PUBLICATIONS

Han et al., "Compile–time synchronization optimizations for software DSMs", IEEE, 1998, pp. 662–669.

Hsieh et al., "Optimizing NET compilers for improved Java performance", IEEE 1998, pp. 67–75.

Krishnamurthy et al., "Analyses and optimizations for shared address space programs", Jour. of Par. and Dist. Comput., Academic Press, 1996, pp. 130–144.

Larus, "Compiling for shred memory and message–passing computers", ACM Programm. Lang. and Systems, ACM, 1993, pp. 165–180.

Rogers et al., "Compiling for distributed memory architectures", IEEE, 1994, pp. 281–298.

Tseng, "Compiler optimizations for eliminating barrier synchronization", PROPP '95, ACM, 1995, pp. 144–155.

Yang et al., "PPD: Apractical parallel loop detector for parallelizing compilers on multiprocessor systems"ICICE Trans. on Information and Sytems, ICICE, 1996, pp. 1545–1560.

*Primary Examiner*—Kakali Chaki
*Attorney, Agent, or Firm*—Richard A. Jordan

[57] ABSTRACT

A code generating system generates, from code in a program, native code that is executable by a computer system. The code generating system may be included in a just-in-time compiler used to generate native code that is executable by a computer system, from a program in Java Byte Code form, and specifically generates, in response to Java Byte Code representative of a synchronization statement that synchronizes access by multiple threads of execution to at least one variable contained in the Java Byte code, one or more native code instructions that implements a wait-free synchronization methodology to synchronization access to the at least one variable. Since the instructions which implement the wait-free synchronization methodology do not require calls to the operating system, they can generally be processed more rapidly than other synchronization techniques which do require operating system calls.

18 Claims, 3 Drawing Sheets

SYSTEM AND METHOD FOR SYNCHRONIZING ACCESS TO SHARED VARIABLES IN A VIRTUAL MACHINE IN A DIGITAL COMPUTER SYSTEM

FIELD OF THE INVENTION

The invention relates generally to the field of digital computer systems and more particularly to systems and methods for synchronizing access to variables in a digital computer system which may be shared among a number of threads in a virtual machine.

BACKGROUND OF THE INVENTION

The Java programming language has been developed to facilitate the development of programs that can be executed on a wide variety of computers, independent of the computers' particular system or processor architecture. The Java programming language is generally object-oriented, and a program developer generates a Java program in the form of one or more classes. A Java compiler ("javac") compiles the program into Java byte code ("JBC") for distribution. When the Java program is to be executed on a computer, the Java bye code can be executed in an interpretive manner by a Java "virtual machine" which is provided on the computer. Alternatively, the Java byte code can be compiled to the native instruction code of the computer on which the Java program is to be executed by, for example, a "just-in-time" ("JIT") compiler. The just-in-time compiler provides the compiled code to the Java virtual machine for execution. In processing the Java program, the Java virtual machine provides a number of services, including interfacing with the computer's operating system to, for example, obtain data ("input") for processing and provide processed data ("output") for storage, display to an operator and so forth.

A problem arises in connection with Java programs in which access to a shared variable must be synchronized among a plurality of threads which may be able to access the shared variable. This problem will be illustrated with the following example. Suppose the source code of a Java program includes Code Segment 1:

Code Segment 1

```
class tock {
    int Ticket;
    int Other;
    int getTicket ( )
    {
        int rslt;
        synchronized (this) {
            rslt = ++Ticket;
        }
        return rslt;
    }
    int getUnsafe ( )
    {
        int rslt ;
        rslt = ++Other;
        return rslt ;
    }
}
```

Code Segment 1 represents a Java class, named "tock," which includes two methods named "getTicket" and "getUnsafe." The method "getTicket" can be called to obtain a result "rslt" which is the increment the value of the variable "Ticket." The incrementation of the variable "Ticket" and the assignment to the result "rslt" is represented by the instruction "rslt=++Ticket". The statement "synchronized (this)" provides that the incrementation and assignment will be executed in a synchronized manner, that is, in a manner that guarantees that, when a thread calls the method "getTicket," other threads will not be able to access the variable "Ticket" during the incrementation and assignment.

The method "getUnsafe" can also be called to obtain a result "rslt" which is the whose value represents the incrementation of another variable, namely, "Other." However, since the method "getUnsafe" does not include a "synchronized ( )" statement, the incrementation and assignment will not be executed in a manner to guarantee that, when a thread calls the method "getUnsafe," other threads will not be able to access the variable "Other" during the incrementation and assignment. This will be described in connection with Code Segment 2. Code Segment 2 depicts code, in native code form, which the Java just-in-time compiler generate for the "++ Other" expression in Code Segment 1. If the computer's native code is the SPARC instruction set (reference SPARC International, Inc [David L. Weaver and Tom Germond (eds)], *The SPARC Architecture Manual Version* 9 (Prentice-Hall, 1994)), the just-in-time compiler would generate native code along the lines of Code Segment 2:

Code Segment 2

(1) ld [o0].Other, o1
(2) add o1, 1, o1
(3) st [o1], [o0].Other

When the computer executes Code Segment 2, it retrieves a value stored in the storage location identified by one of its internal registers and loads the value into another register (line 1), adds the value "one" to the contents of the other register, thereby to increment the value stored therein (line 2), and stores the incremented value in the original storage location (line 3). However, if the thread of execution which includes Code Segment 2 is pre-empted after line 1 is executed, but before line 3 is finished, to allow another thread to execute, the value stored in the storage location may be modified by another thread, which can cause problems when the one thread (that is, the thread which includes Code Segment 2) resumes execution. Similarly, if the computer is a multi-processor system, in which one processor is executing the thread that includes Code Segment 2 and another processor is executing another thread, the other processor may modify the value in the storage location after the one processor (that is, the processor executing the threat that includes Code Segment 2) executes line 1 but before it finishes executing line 3, problems can similarly ase.

Although avoiding the use of the "synchronized ( )" statement, as in the "getUnsafe" method described above, can lead to the undesirable consequence that other threads can have access to a variable that is shared among a plurality of threads, use of the "synchronized ( )" statement, as in the "getTicket" method described above, can also lead to an undesirable consequence. In particular, the "synchronized ( )" statement in the source code typically is transformed into synchronization primitives which can take a relatively long time to execute. Thus, a "synchronized ( )" statement in the source code can require a relatively long time for the computer to process. This will be shown in the following.

The Java compiler compiles Code Segment 1 into Java Byte Code represented by Code Segment 3:

Code Segment 3

```
class tock extends java.lang.Object
{
    int Ticket;
    Int Other;
    tock ( );
    int getUnsafe ( );
    int getTicket ( );
}
Method tock ( )
    0   aload_0
    1   invokespecial #3 <Method java.lang.Object>
    4   return
Method int getUnsafe ( )
    0   aload_0
    1   dup
    2   getfield #4 <Field int Other>
    5   iconst_1
    6   iadd
    7   dup_x1
    8   putfield #4 <Field int Other>
    11  istore_1
    12  iload_1
    13  ireturn
Method int getTicket( )
    0   aload_0
    1   astore_2
    2   aload_2
    3   monitorenter
    4   aload_0
    5   dup
    6   getfield #5 <Field int Ticket>
    9   iconst_1
    10  iadd
    11  dup_x1
    12  putfield #5 <Field int Tidket>
    15  istore_1
    16  aload_2
    17  monitorexit
    18  goto 24
    21  aload_2
    22  monitorexit
    23  athrow
    24  iload_1
    25  ireturn
Exception table:
    from    to      target  type
    4       16      21      any
```

In Code Segment 3, Java Byte Code, emitted by javac (the Java compiler) is provided for both the "getTicket" method and the "getUnsafe" method for the compiled tock class. The code for the "getUnsafe" method is provided in the portion of Code Segment 3 immediately following the line "Method int getUnsafe ( )" and the code for the "getTicket method is provided in the portion of Code Segment 3 immediately following the line "Method int getTicket ( )." The code for the two methods has a number similarities, in particular, the code for most of the "getUnsafe" method, in particular lines 0 through 12, essentially corresponds to lines 4 through 16 of the "getTicket" method. The code in these lines essentially controls the incrementation and assignment functions for both methods. The "getTicket" method also has, immediately preceding and following this code, a "monitorenter" ("monitor enter") code (line 3) and a "monitorexit" ("monitor exit") code (line 17), which is provided in response to the "synchronized ( )" statement in the source code (Code Segment 1).

As noted above, prior to execution by a computer, the Java Byte Code of Code Segment 3 can be compiled by the just-in-time compiler into the computer's native code. For the portion of Code Segment 3 provided for the "getTicket" method, if the computer's native code is the SPARC instruction set, the just-in-time compiler would generate native code along the lines of Code Segment 4:

Code Segment 4

```
(1)         Tock$getTicket
(2)             save %sp,   -64, %sp              !!subroutine enter
(3)  prolog
(4)             ld          [%i0].ObjectLock, %10 !!get lock variable
(5)             call        mutex_enter           !!begin synchroni-
                                                    zation
(6)             mov         %10, %o0
(7)             ld          [%i0].Ticket, %o0
(8)             add         %o0, 1,    %o0        !!increment Ticket
(9)             st          %o0, [%i0].Ticket
(10)            call        mutex_exit            !!.end synchroni-
                                                    zation
(11)            mov         %10, %o0
(12)            ret                               !!subroutine exit
(13) epilog
(14)            restore
```

In Code Segment 4, the just-in-time compiler makes use of synchronization primitives "mutex_enter" ("mutual exclusion enter") and "mutex_exit" ("mutual exclusion exit") to provide the synchronization to the variable "Ticket." However, each of the "mutex_enter" and "mutex_exit" synchronization primitives requires execution of a large number of instructions, in some cases requiring calls to the operating system kernel. Thus, use of such synchronization primitives can result in relatively long processing times.

SUMMARY OF THE INVENTION

The invention provides a new and improved system and method for synchronizing access to variables which may be shared among a plurality of threads of execution in a digital computer system.

In brief summary, the invention provides a code generating system that generates, from code in a program to native code that is executable by a computer system. The code generating system may be included in a just-in-time compiler used to generate native code that is executable by a computer system, from a program in Java Byte Code form, and specifically generates, in response to Java Byte Code representative of a synchronization statement that synchronizes access by multiple threads of execution to at least one variable contained in the Java Byte code, one or more native code instructions that implements a wait-free synchronization methodology to synchronization access to the at least one variable. Since the instructions which implement the wait-free synchronization methodology do not require calls to the operating system, they can generally be processed more rapidly than other synchronization techniques which do require operating system calls.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

DETAILED DESCRIPTION OF AN ILLUSTRATIVE EMBODIMENT

Figure 1:
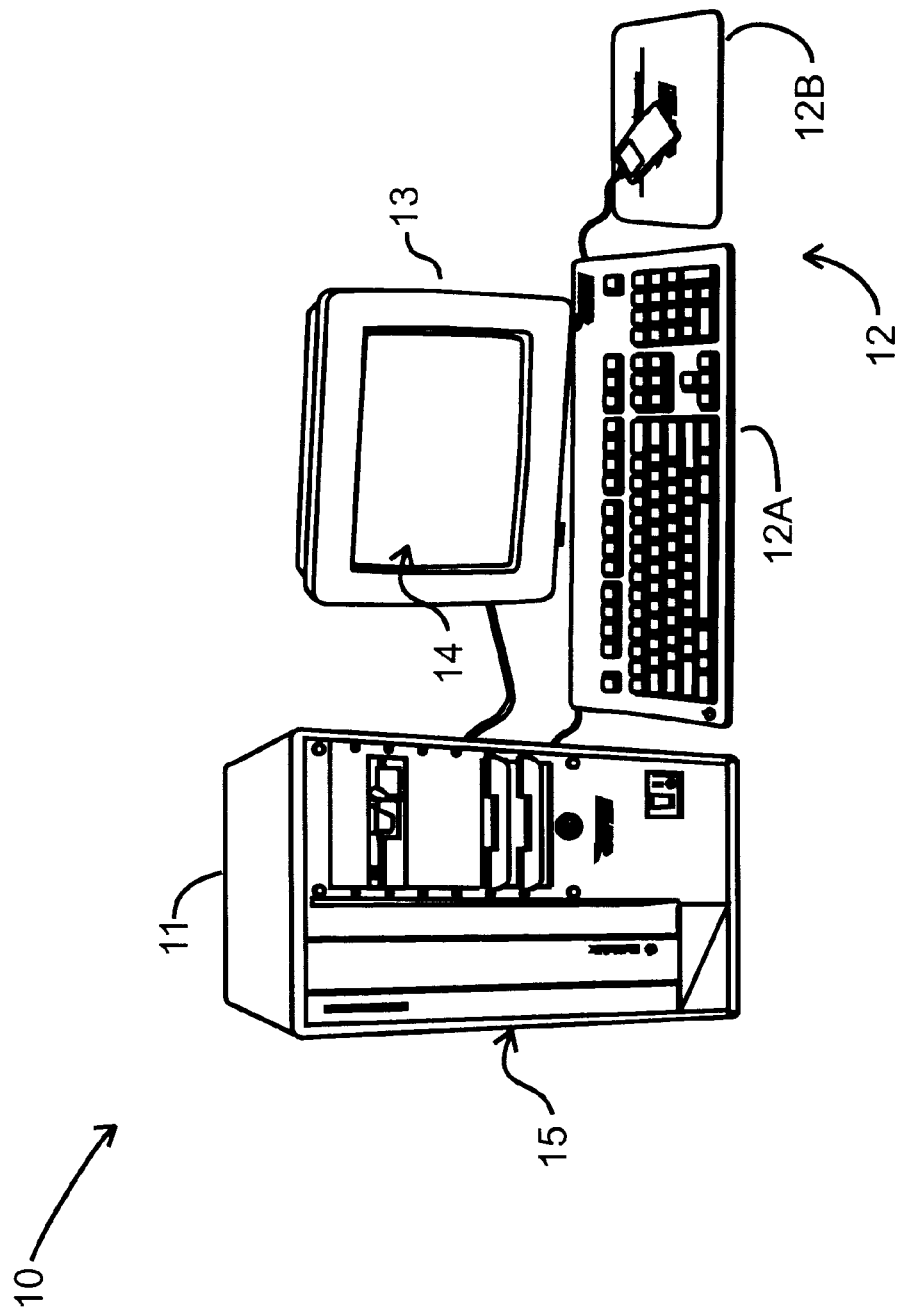
FIG. 1 depicts an illustrative digital computer system including an arrangement for synchronizing access to variables which may be shared among a plurality of threads of execution, constructed in accordance with the invention.

FIG. 1 depicts an illustrative computer system 10 including an arrangement for synchronizing access to variables which may be shared among a plurality of threads of execution, constructed in accordance with the invention. With reference to FIG. 1, the computer system 10 in one embodiment includes a processor module 11 and operator interface elements comprising operator input components such as a keyboard 12A and/or a mouse 12B (generally identified as operator input element(s) 12) and operator output components such as a video display device 13 with integral speakers 15. The illustrative computer system 10 is of the conventional stored-program computer architecture.

The processor module 11 includes, for example, processor, memory and mass storage devices such as disk and/or tape storage elements (not separately shown) which perform processing and storage operations in connection with digital data provided thereto. The mass storage subsystems may include such devices as disk or tape subsystems, optical disk storage devices and CD-ROM devices in which information may be stored and/or from which information may be retrieved. One or more of the mass storage subsystems may utilize removable storage media which may be removed and installed by an operator, which may allow the operator to load programs and data into the digital computer system 10 and obtain processed data therefrom. Under control of control information provided thereto by the processor, information stored in the mass storage subsystems may be transferred to the memory for storage. After the information is stored in the memory, the processor may retrieve it from the memory for processing. After the processed data is generated, the processor may also enable the mass storage subsystems to retrieve the processed data from the memory for relatively long-term storage.

The operator input element(s) 12 are provided to permit an operator to input information for processing and/or control of the digital computer system 10. The video display device 13 and speakers 15 are provided to, respectively, display visual output information on a screen 14, and audio output information, which are generated by the processor module 11, which may include data that the operator may input for processing, information that the operator may input to control processing, as well as information generated during processing. The processor module 11 generates information for display by the video display device 13 using a so-called "graphical user interface" ("GUI"), in which information for various applications programs is displayed using various "windows." Although the computer system 10 is shown as comprising particular components, such as the keyboard 12A and mouse 12B for receiving input information from an operator, and a video display device 13 for displaying output information to the operator, it will be appreciated that the computer system 10 may include a variety of components in addition to or instead of those depicted in FIG. 1.

In addition, the processor module 11 may include one or more network or communication ports, generally identified by reference numeral 15, which can be connected to communication links to connect the computer system 10 in a computer network, or to other computer systems (not shown) over, for example, the public telephony system. The ports enable the computer system 10 to transmit information to, and receive information from, other computer systems and other devices in the network.

Figure 2:
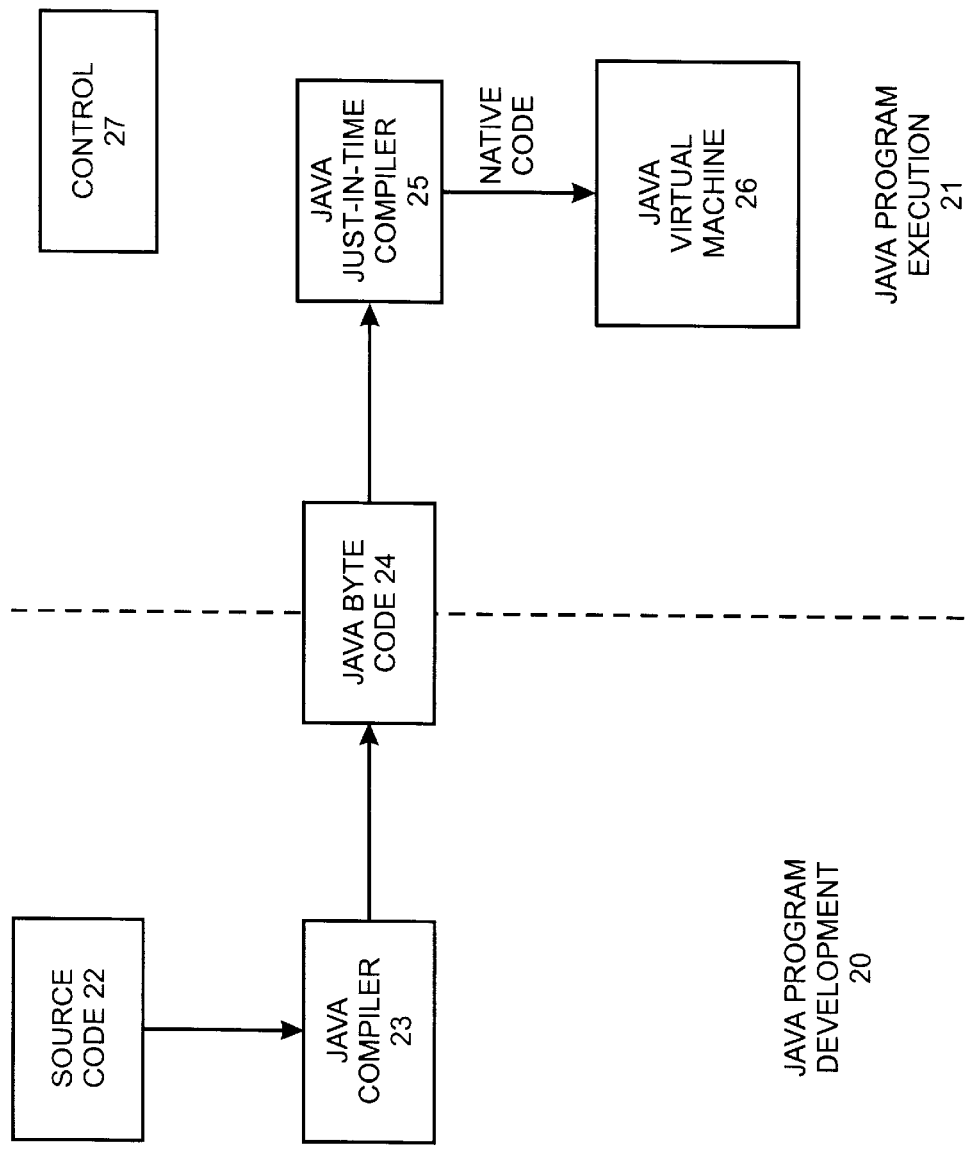
FIG. 2 is a functional block diagram of an arrangement constructed in accordance with the invention.

The invention provides an arrangement, which will be described below in connection with FIG. 2, for synchronizing access to variables which may be shared among a plurality of threads of execution, and which can result in reduced processing times in relation to use of conventional synchronization primitives, such as the "mutex_enter" and "mutex_exit" primitives as described above, with relatively long processing times. With reference to FIG. 2, the arrangement makes use of two general portions, including a Java program development portion 20 and a Java program execution portion 21. Generally, the Java program development portion 20 includes elements that a Java program developer uses to develop a program for distribution, and the Java program execution portion 21 includes elements that enable the Java program to be executed. The Java program development portion 20 and the Java program execution portion 21 may both form part of the same computer system, such as computer system 10. Alternatively, the Java program development portion 20 and the Java program execution portion 21 can form part of separate computer systems, and the Java program developed on one computer system (that is, the computer system including the Java program development portion 20) can be provided to the computer system on which the Java program is to be executed (that is, the computer system that includes the Java program execution portion 21) using any conventional mechanism suitable for distributing Java programs, including, for example, magnetic or optical disks, transfers over networks such as the Internet or the like.

More specifically, the Java program development portion 20 includes elements that a Java program developer uses to generate a Java program in a form that can be distributed, including, for example, elements of the computer system as described above that enable the input of information to the computer, the information that is input being in the form of Java program source code 22. The Java program source code 22 input by the program developer is, in turn, compiled by a Java compiler ("javac") 23 to generate Java byte code ("JBC") 24, which can be distributed as described above for execution. The Java program source code 22 may include synchronization statements similar to that described above in connection with Code Segment 1 (that is, the synchronized (this) { . . . }" statement) which serve to synchronize access to variables which may be shared among multiple threads when the program represented by the Java program source code is executed. If the Java compiler 23 determines that the Java program source code 22 does include a synchronization statement, it (that is, the Java compiler 23) can generate Java byte code 24 which includes the appropriate "monitorenter" and "monitorexit" code pair as described above in connection with Code Segment 3 to provide synchronization for the portion of the code that present therebetween.

The Java program execution portion 21 includes elements that enable the Java byte code 24 to be executed by the computer system 10. The Java program execution portion includes a Java just-in-time ("JIT") compiler 25 and a Java virtual machine 26, both of which operate under control of a control module 27. The control module 27 may include, for example, elements of the operating system (not separately shown) which controls the computer system 10. The Java just-in-time compiler 25 receives the Java bye code 24 and generates therefrom native code for the computer system 10, which is provided to the Java virtual machine 26 for execution. The Java just-in-time compiler 25 generally generates the native code in a conventional manner, except when it encounters Java byte code representative of a synchronization statement. In accordance with the invention, the Java just-in-time compiler, when it encounters Java byte code representative of a synchronization statement, such as the "monitorenter" and "monitorexit" code pair described above in connection with Code Segment 3, instead of using the "mutex_enter" and "mutex_exit" (or similar) synchronization primitives as described above in connection with Code Segment 4, each of which can require a relatively large number of instructions and possibly a system call to complete, makes use of a wait-free synchronization methodology to provide synchronization for the shared variable (s). As an example of the wait-free synchronization methodology, the Java just-in-time compiler 25, in compiling Code Segment 3, instead of generating Code Segment 4 above, and specifically lines 4 through 10, would generate native code along the lines of that depicted in Code Segment 5:

|  | Code Segment 5 | | | |
| --- | --- | --- | --- | --- |
| (1) | Tock$getTicket: | | | |
| (2) | Retry: | | | |
| (3) |  | ld | [%o0].Ticket, %o1 | |
| (4) |  | add | %o1, 1, %o2 | |
| (5) |  | cas | [%o0].Ticket, %o1, %o2 | !!atomic compare-and-swap |
| (6) |  | cmp | %o1, %o2 | |
| (7) |  | bne | retry | |
| (8) |  | nop | | |
| (9) |  | retl | | |
| (10) |  | add | %o1, 1, %o0 | !!return result |

In executing Code Segment 5, the computer system 10 initially loads the value of the variable "Ticket," which is stored in a location in the computer system's memory (not separately shown) pointed to by the contents of a first register ("[%o0]") into second register ("%o1") (line 3). Thereafter, the computer system 10 adds the value "one" to the contents of the second register and stores the sum in a third register ("%o2") (line 4).

The computer system 10 then executes a "compare-and-swap" instruction (line 5). In the compare-and-swap instruction, the computer system compares the value of the variable "Ticket" as stored in the location in memory ("[%o0]") to the contents of the second register ("%o1l"), and (i) if it determines that the values are the same, it swaps the value in the third register ("%o2") with the value the memory location pointed to by the contents of the first register ("[%o0]"), but (ii) if it determines that the values are not the same, it loads the value in the memory location pointed to by the first register ("[%o0]") in the second register ("%o2"), and leaves the value in the memory location pointed to by the contents of the first register ("[%o0]") unchanged.

The "compare-and-swap" instruction (line 5) is guaranteed to be atomic over the computer system, even for computer systems which have multiple processors. Thus, if, in processing the "compare-and-swap" instruction, the computer system 10 determines that the value in the memory location pointed to by the contents of the first register ("[%o0]") equals the value in the second register ("%o1"), which will be the case if the value of the variable "Ticket" stored in that memory location has not been changed since it (that is, the value) was loaded into the second register ("%o1"), then (in accordance with (i) above) the computer system 10 will, in processing the compare-and-swap instruction, swap the value in the third register ("%o2") with the value in that memory location. It will be appreciated that (a) the value stored in the memory location "[%o0]" pointed to by the first register, and associated with the variable "Ticket," will correspond to the value ofthe variable "Ticket" as loaded into the second register ("%o1"), incremented by the value "one" by the add instruction in line (2), and (b) the value stored in the third register ("%o2") will correspond to the original value of the variable "Ticket" as stored in the memory location pointed to by the first register ("[%o0"] and as loaded in the second register ("%o1") in the load instruction in line (3).

On the other hand, if the computer system 10 determines that the value in the memory location pointed to by the contents of the first register ("[%o0]") does not equal the value in the second register ("%o1"), which will be the case if the value of the variable "Ticket" stored in that memory location has been updated by, for example, another thread since it (that is, the value) was loaded into the second register ("%o1"), then (in accordance with (ii) above) the computer system 10 will, in processing the compare-and-swap instruction, store the value in the memory location pointed to by the first register ("[%o0]") in the third register ("%o2"), and leave the value in the memory location pointed to by the contents of the first register ("[%o0]"), and associated with the variable "Ticket," unchanged. It will be appreciated that the value stored in the third register ("%o2") will correspond to the updated value of the variable "Ticket."

After executing the compare-and-swap instruction (line 5), the computer system 10 executes a "compare" instruction (line 6) to compare the contents of the second and third registers ("%o1" and "%o2"). If the computer system determines that the contents of the second and third registers ("%o1" and "%o2") are equal (reference item (b) above), then the swap (reference item (a) above) occurred during execution of the "compare-and-swap" instruction (line 4). In that case, the value stored in the memory location "[%o0]" pointed to by the first register, and associated with the variable "Ticket," will correspond to the value of the variable "Ticket" as loaded into the second register ("%o1"), incremented by the value "one" by the add instruction in line (2). Accordingly, in executing the next instruction, that is, the "branch-if-not-equal" instruction (line 7), the computer system 10 sequences through the next instructions ("nop," in line 8 and "retl" in line 9) to the "add" instruction in line 10 to return the result.

On the other hand, if, in executing the "compare" instruction (line 6), the computer system 10 determines that the contents of the second and third registers ("%o1" and "%o2") are not equal, the swap (reference item (a) above) did not occur, and the value stored in the memory location "[%o0]" pointed to by the first register, and associated with the variable "Ticket," does not correspond to the value of the variable "Ticket" as loaded into the second register ("%o1"), incremented by the value "one" by the add instruction in line (2). Accordingly, in executing the "branch-if-not-equal" instruction (line 7), the computer system 10 branches to line 2 and repeats lines (3) through (6). The computer system 10 will repeat lines (3) through (6) until it determines, in executing the "compare" instruction (line 6), that the contents of the second and third registers ("%o1" and "%o2") are equal. When that occurs, the value stored in the memory location "[%o0]" pointed to by the first register, and associated with the variable "Ticket," will correspond to the value of the variable "Ticket" as loaded into the second register ("%o1"), incremented by the value "one" by the add instruction in line (2). Accordingly, in executing the next instruction, that is, the "branch-if-not-equal" instruction (line 7), the computer system 10 sequences through the next instruction ("nop," in line 8) to the "add" instruction in line 9 to return the result.

The use of the wait-free synchronization methodology, illustratively described above in connection with Code Segment 5, provides a number of advantages. In particular, the code path is shorter, requiring only a few instructions which are relatively quickly executed and without requiring system calls to the operating system kernel. Unlike the use of synchronization primitives such as "mutex_enter" and "mutex_exit," which essentially operate to provide coarse-grained locking, the wait-free synchronization methodology serves to provide a fine-grained locking on each variable independently, in particular, the variable that is referenced in the compare-and-swap instruction (reference line 5 of Code Segment 5). If access to multiple variables is to be synchronized, the wait-free synchronization methodology can be used on each variable separately. The more fine-grained locking provided by the wait-free synchronization methodology also serves to increase the potential parallelism as among contemporaneously-executing threads, since multiple threads can have access to variables that are not synchronized, but for which access might be inhibited if coarse-grained synchronization primitives were to be used. Although the wait-free synchronization methodology does include a potential loop (reference the "branch-if-not-equal" instruction in line 7) it should be noted that, since the time interval between execution of the load instruction in line 3 and the compare-and-swap instruction in line 5 would normally be very short, in which case the branch would typically not be taken more that a few times if at all.

As noted above, other than in connection with compiling Java byte code representative of a synchronization statement, the Java just-in-time compiler 25 can generate native code in a conventional manner. In addition, the Java virtual machine 26 can execute the code provided thereto by the Java just-in-time compiler 25 in a conventional manner.

Figure 3:
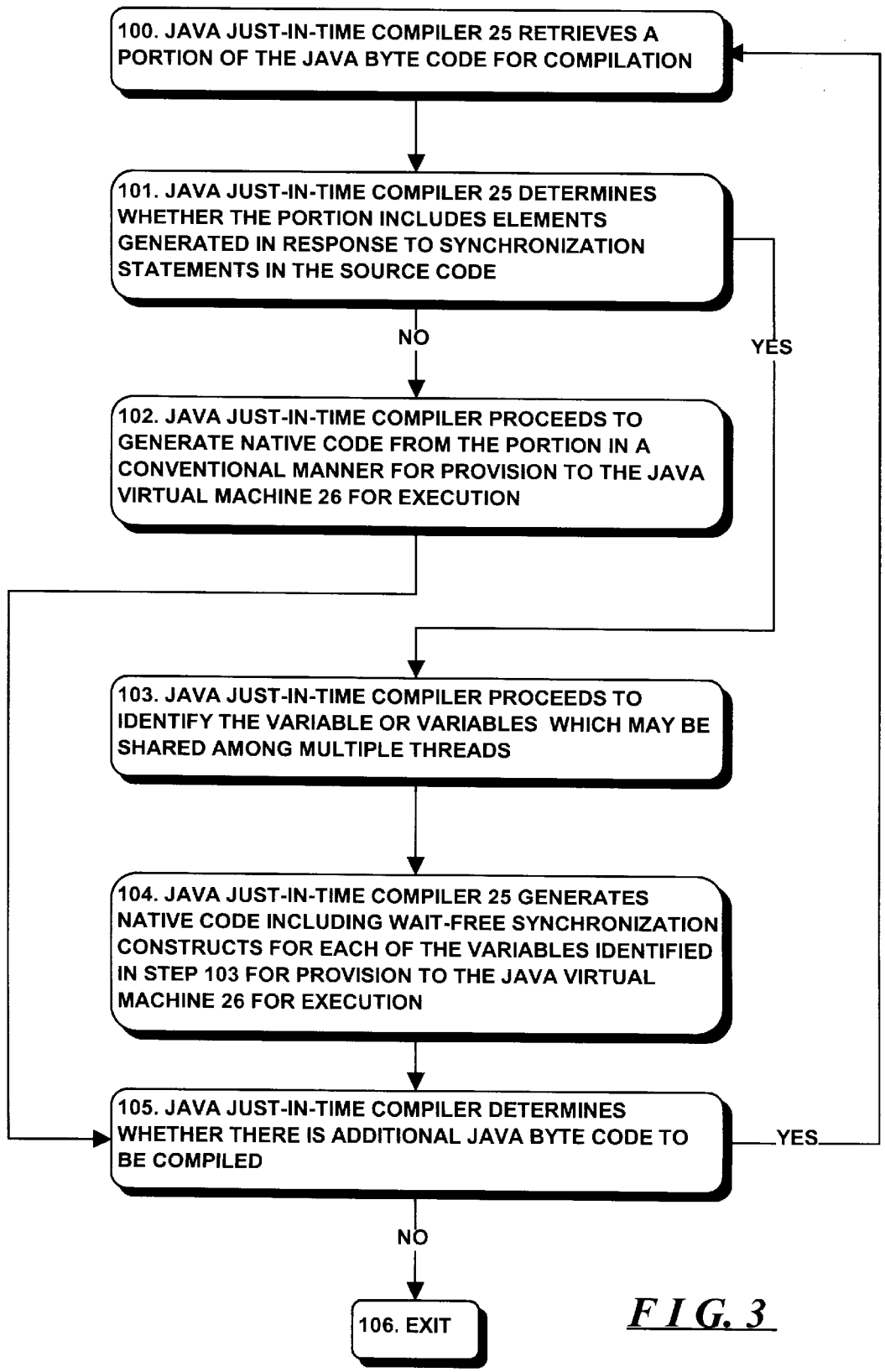
FIG. 3 is a flow diagram depicting operations performed in connection with the invention.

With this background, the general operations performed by the Java just-in-time compiler 25 in compiling Java byte code 24 will be described in connection with the flowchart depicted in FIG. 3. With reference to FIG. 3, the Java just-in-time compiler 25 retrieves a portion of the Java byte code for compilation (step 100) and determines whether the portion includes elements generated in response to synchronization statements in the source code (step 101). If the Java just-in-time compiler makes a negative determination in step 101, it proceeds to generate native code from the portion in a conventional manner for provision to the Java virtual machine 26 for execution (step 102). However, if the Java just-in-time compiler makes a positive determination in step 101, it proceeds to identify the variable or variables which may be shared among multiple threads (step 103) and generates native code including wait-free synchronization constructs for each of the variables identified in step 103 for provision to the Java virtual machine 26 for execution (step 104). The Javajust-in-time compiler determines whether there is additional Java byte code to be compiled (step 105). If the Javajust-in-time compiler makes a positive determination in step 105, it can return to step 100 to compile the next Java byte code portion. On the other hand, if the Java just-in-time compiler makes a negative determination in step 105, it may exit (step 106).

The invention provide a number of advantages. In particular, the invention provides a compiler for compiling code, such as Java byte code, that includes variables which may be shared by a plurality of threads, into native code, with the native code including code that synchronizes access to the shared variables in an accelerated manner, avoiding long instruction paths and operating system calls that can slow execution.

It will be appreciated that a number of variations and modifications may be made to the invention as described above. For example, although the invention has been described as providing the Java just-in-time compiler 25 to compile the Java byte code 24 to native code for execution by the Java virtual machine 26, it will be appreciated that the Java byte code 24 can be provided directly to the Java virtual machine 26 for execution in a interpretive manner. In that case, the Java virtual machine 26 can, during execution, make use of the wait-free synchronization methodology to provide synchronization for shared variables when it encounters Java byte code representative of a synchronized statement.

In addition, although the invention has been described in connection with the Java programming language, it will be appreciated that the invention can be used in connection with any programming language. Similarly, although the invention has been described in connection with the Java programming language's "synchronized ( )" statement, it will be appreciated that the invention can be used in connection with any statement or method (such as the Java programming language's "synchronized ( )" method) that can be used to facilitate synchronization of access to variables that may be shared among a plurality of threads.

Furthermore, although the invention has been described in connection with incrementing of variables that may be shared among a plurality of threads, it will be appreciated that the invention can be used in connection with use of other types of shared variables. For example, pointers used in connection with linked lists may be shared among a plurality of threads executing in a computer system. Such pointers may be accessed both in connection with processing of threads for removing, or unlinking, nodes from a list, as well as in connection with processing of threads for appending, or linking, nodes onto the list. Thus, if, for example, a thread is to append a node at the head of a linked list, it may have source code along the lines depicted in Code Segment 6:

Code Segment 6

```
class List {
    Node head;
    void prepend (Node x)
    {
        synchronized (this) {
            x.Next = head;
            head = x;
        }
    }
}
``` where "prepend" is a method for appending a node, which is pointed to by a variable "x," to the head of a linked list whose current first node is pointed to by the variable "head." The node to be appended includes a field "x.Next" that is to receive a value that points to the next node in the linked list.

It will be appreciated that the "next node," he pointer to which is to be loaded into the field "x.Next" of the node to be appended, corresponds to the node that is the current head of the linked list. Thus, in the prepend method, (i) the "x.Next=head" statement enables the value of "head" to be loaded into the "x.Next" field of the node to be appended, thereby to enable the pointer to the node that is currently the head of the linked list to be loaded into the field to point to the node that is the current head of the linked list, and (ii) the "head=x" statement enables the value of "x," which points to the node to be prepended, to be loaded into the variable "head," thereby to enable the variable "head" to point to the node comprising the new head of the linked list.

The variable "x," the field "x.Next" and the variable "head" all represent storage locations in the computer system's memory. The variable "head" can be one of a plurality of variables in a descriptor block for the linked list, which variables may include, for example, a tail pointer, a length pointer and the like. The variable "head" may be shared among a plurality of threads which may concurrently attempt to control operations in connection with the head of the linked list, and so access to that variable is to be synchronized.

Accordingly, the Java just-in-time compiler will generate, from Java byte code generated from Code Segment 6, native code along the lines of Code Segment 7:

|  | Code Segment 7 | | |
|---|---|---|---|
| (1) | List$prepend | | |
| (2) | Retry: | | |
| (3) | mov | %o1, %o4 | !!reg %o1 contains pointer to node to be prepended |
| (4) | ld | [%o0].Head, %o3 | !!reg %o0 contains pointer to list descriptor block |
| (5) | st | %o3, [%o1].Next | |
| (6) | cas | [%o0].Head, %o3, %o4 | |
| (7) | cmp | %o3, %o4 | |
| (8) | bne | Retry | |
| (9) | nop | | |
| (10) | retl | | !!return |
| (11) | nop | | |

In Code Segment 7, one register ("%o0") contains a pointer to the storage location in memory for the descriptor block for the linked list to which the node it to be prepended, and a second register ("%o11") contains a pointer to the storage location in memory ofthe node to be prepended. As noted above in connection with Code Segment 6, the descriptor block includes a field which contains the "head" variable that points to the first node in the linked list, and the address for the storage location in memory forthat field is represented by "[%o0].Head" in Code Segment 7. As further noted above in connection with Code Segment 6, the node to be prepended includes a "next" node pointer field ("x.Next"), and the address for the storage location in memory for that field is represented by "[%o1].Next" in Code Segment 7. In executing Code Segment 7, the computer system will initially copy the contents of the second register ("%o1") to a third register ("%o4") (line 3). In addition, the computer system will retrieve the value of the variable "head" from the memory and load it into a fourth register ("%o3") (line 4). It will be appreciated that the value stored in the fourth register ("%o3") points to the node that corresponds to the current head of the linked list. The computer system will then store the contents of the fourth register ("%o3") in the storage location in memory for the "next" node pointer field ("x.Next") (line 5), thereby to copy the pointer to the current head node of the linked list to the "next" node pointer field ("x.Next") of the node to be prepended.

Thereafter, the computer system will perform the "compare-and-swap" instruction (line 6) in connection with the storage location in memory which contains the head pointer field of the descriptor block ("[%o0].Head"), the contents of the fourth register ("%o3") (which correspond to the value of the head pointer field as retrieved in connection with the instruction in line (4)) and the contents of the third register ("%o4") (which correspond to the pointer to the node to be prepended, as indicated above in connection with the instruction in line (3)). In executing the compare-and-swap instruction, the computer system will compare the value of the head pointer field as stored in the location ("[%o0].Head") in memory to the contents of the fourth register ("%o3"), and (i) if it determines that the values are the same, it swaps the value in the third register ("%o4") with the value of the head pointer field from the location ("[%o0].Head") in memory, but (ii) if it determines that the values are not the same, it loads the value from the head pointer field from the location ("[%o0].Head") in memory into the third register ("%o4"), and leaves the value of the head pointer field in location ("[%o0].Head") of the memory unchanged.

Thus, if, in processing the "compare-and-swap" instruction, the computer system 10 determines that the head pointer field from the memory ("[%o0].Head") equals the value in the fourth register ("%o3"), which will be the case if the contents of the head pointer field stored in that memory location has not been changed since they (that is, the contents) were loaded into the fourth register ("%o3") (Code Segment 7, line 4), then (in accordance with (i) above) the computer system 10 will, in processing the compare-and-swap instruction, swap the value in the third register ("%o4") with the value in that memory location. It will be appreciated that (a) the head pointer stored in the descriptor block in memory "[%o0].Head" will comprise the pointer to the node to be prepended, and (b) the value stored in the third register ("%o4") will correspond to the original value of the head pointer from descriptor block in location ("[%o0"].Head") in memory and as loaded into the fourth register ("%o3") in the load instruction in line (4).

On the other hand, if the computer system 10 determines that the value in the head pointer field from the descriptor block in location ("[%o0].Head") in memory does not equal the value in the fourth register ("%o3"), which will be the case if the value in the head pointer field has been updated by, for example, another thread since it (that is, the value in the head field) was loaded into the fourth register ("%o3") (Code Segment 7, line 4), then (in accordance with (ii) above) the computer system 10 will, in processing the compare-and-swap instruction, load the value in the head pointer field in location ("[%o0].Head") in memory in the third register ("%o4"), and leave the value in the head pointer field in location ("[%o0].Head") in memory unchanged. It will be appreciated that the value stored in the third register ("%o4") will correspond to the updated head pointer.

Following the compare-and-swap instruction, the computer system will execute a compare instruction (line 7) to compare the contents of the third and fourth registers ("%o4" and "%o3"). If the computer system determines that the contents of the third and fourth registers ("%o4" and "%o3") are equal (reference item (b) above), then the swap (reference item (a) above) occurred during execution of the "compare-and-swap" instruction (line 6). In that case, the value in head pointer field in location "[%o0].Head" in memory will correspond to the value of the head pointer filed as loaded into the third register ("%o4") (Code Segment 7, line 4). Accordingly, in executing the next instruction, that is, the "branch-if-not-equal" instruction (line 8), the computer system 10 sequences through the next instruction ("nop," in line 9) to the "ret1" return instruction in line 10.

On the other hand, if, in executing the "compare" instruction (line 6), the computer system 10 determines that the contents of the third and fourth registers ("%o4" and "%o3") are not equal, the swap (reference item (a) above) did not occur, and the value of the head pointer field as stored in the location "[%o0].Head" in memory does not correspond to the value of the head pointer field as stored in the fourth register ("%o3") (Code Segment 7, line 4). Accordingly, in executing the "branch-if-not-equal" instruction (line 8), the computer system 10 branches to line 2 and repeats lines (3) through (7). The computer system 10 will repeat lines (3) through (7) until it determines, in executing the "compare" instruction (line 7), that the contents of the fourth and third registers ("%o3" and "%o4") are equal. When that occurs, the value ofthe head pointer field as stored in the memory location "[%o0].Head" will correspond to the value of the head pointer field as loaded into the fourth register ("%o3") (Code Segment 7, line 4). Accordingly, in executing the next instruction, that is, the "branch-if-not-equal" instruction (line 7), the computer system 10 sequences through the next instruction ("nop," in line 8) to the "ret1" return instruction in line 9.

Usage of the invention in connection with use of other types of shared variables will be apparent to those skilled in the art.

Furthermore, it will be appreciated that, if multiple threads are concurrently attempting to access a shared variable using the "wait-free synchronization" methodology as described above, the threads may all continually execute their respective "retry" loops. To alleviate that, each thread may include, in its respective "retry" loop, instructions which implement a variable retry delay strategy, such as exponential back-off, so that they will enter their retry loops at different points in time and avoid such deadlocks. Such delay strategies can be readily implemented by those skilled in the art.

In addition, although the invention has been described in connection with the "compare-and-swap" instruction, it will be appreciated that the invention can be used in connection with numerous other types of instructions, including, for example, a "load-locked and store-conditional" instruction. It is preferable that the instruction be executed atomically, and that the instruction that provides that the contents of the storage location for the shared variable be updated if they (that is, the contents) have not been modified.

It will be appreciated that a system in accordance with the invention can be constructed in whole or in part from special purpose hardware or a general purpose computer system, or any combination thereof, any portion of which may be controlled by a suitable program. Any program may in whole or in part comprise part of or be stored on the system in a conventional manner, or it may in whole or in part be provided in to the system over a network or other mechanism for transferring information in a conventional manner. In addition, it will be appreciated that the system may be operated and/or otherwise controlled by means of information provided by an operator using operator input elements (not shown) which may be connected directly to the system or which may transfer the information to the system over a network or other mechanism for transferring information in a conventional manner.

The foregoing description has been limited to a specific embodiment of this invention. It will be apparent, however, that various variations and modifications may be made to the invention, with the attainment of some or all of the advantages of the invention. It is the object of the appended claims to cover these and such other variations and modifications as come within the true spirit and scope of the invention.

What is claimed as new and desired to be secured by Letters Patent of the United States is:

1. A code generator for generating, from code in a program, native code executable by a computer system, the code generator comprising:
   A. a code portion receiver configured to receive a portion of the program code for which the native executable code is to be generated
   B. a synchronization statement detector configured to determine whether the received program code portion includes a statement for synchronizing access by multiple execution threads to at least one variable contained within the obtained code; and
   C. a native code generator configured to, in response to positive determination by said synchronization statement detector, generate native code for the synchronization statement including a wait-free synchronization construct to synchronize access to the at least one variable.

2. A code generator as defined in claim 1 in which the native code generator is further configured to, in response to a negative determination by the synchronization statement detector, generate native code in a conventional manner.

3. A code generator as defined in claim 1 in which the native code generator is configured to generate the wait-free synchronization construct as including at least one native code instruction configured to enable the computer system to:
   A. retrieve a value from a storage location for the variable;
   B. perform a predetermined operation in connection with the value to generate a modified value;
   C. perform an atomic compare-and-swap operation in connection with the value, the modified value and contents of the storage location to compare the value to the contents of the storage location and
      (i) if the value corresponds to the contents of the storage location, store the modified value in the storage location, but
      (ii) if the value does not correspond to the contents of the storage location, update the modified value with the contents of the storage location;
   D. compare the value and the modified value and, if the value and modified value correspond continue, but, if the value and modified value do not correspond, perform a subsequent iteration of the at least one native code instruction.

4. A code generator as defined in claim 1 in which the program includes instructions in Java Byte Code.

5. A code generator as defined in claim 1 in which the native code generator is in the form of a just-in-time compiler.

6. A code generator as defined in claim 1 in which, if the synchronization statement detector detects synchronization statements for synchronizing access to a plurality of variables, the native code generator generates a wait-free synchronization construct associated with each of said plurality of variables.

7. A code generation method for generating, from code in a program, native code executable by a computer system, the code generation method comprising the steps of:

A. receiving a portion of the program code for which the native executable code is to be generated
   B. determining whether the received program code portion includes a statement for synchronizing access by multiple execution threads to at least one variable contained within the obtained code; and
   C. in response to positive determination during said synchronization statement determination step, generate native code for the synchronization statement including a wait-free synchronization construct to synchronize access to the at least one variable.

8. A code generation method as defined in claim 7 in which the native code generation step includes the step of, in response to a negative determination by the synchronization statement detector, generating native code in a conventional manner.

9. A code generation method as defined in claim 7 in which the native code generation step includes the step of generating the wait-free synchronization construct to include at least one native code instruction configured to enable the computer system to:

A. retrieve a value from a storage location for the variable;
   B. perform a predetermined operation in connection with the value to generate a modified value;
   C. perform an atomic compare-and-swap operation in connection with the value, the modified value and contents of the storage location to compare the value to the contents of the storage location and
      (i) if the value corresponds to the contents of the storage location, store the modified value in the storage location, but
      (ii) if the value does not correspond to the contents of the storage location, update the modified value with the contents of the storage location;
   D. compare the value and the modified value and, if the value and modified value correspond continue, but, if the value and modified value do not correspond, perform a subsequent iteration of the at least one native code instruction.

10. A code generation method as defined in claim 7 in which the program includes instructions in Java Byte Code.

11. A code generation method as defined in claim 7 in which the native code generating step includes the step of using a just-in-time compiler.

12. A code generation method as defined in claim 7 in which, if the synchronization statement determination step includes the step of detecting synchronization statements for synchronizing access to a plurality of variables, the native code generation step including the step of generating a wait-free synchronization construct associated with each of said plurality of variables.

13. A computer program product for use in connection with a computer to provide a code generator for generating, from code in a program, native code executable by a computer system, the computer program product comprising a computer-readable medium having encoded thereon:

A. a code portion receiver module configured to enable the computer to receive a portion of the program code for which the native executable code is to be generated
   B. a synchronization statement detector module configured to enable the computer to determining whether the received program code portion includes a statement for synchronizing access by multiple execution threads to at least one variable contained within the obtained code; and
   C. a native code generator module configured to enable the computer to, in response to positive determination by said synchronization statement detector, generate native code for the synchronization statement including a wait-free synchronization construct to synchronize access to the at least one variable.

14. A computer program product as defined in claim 13 in which the native code generator module is further configured to enable the computer to, in response to a negative determnination during execution of the synchronization statement detector module, generate native code in a conventional manner.

15. A computer program product as defined in claim 13 in which the native code generator module is configured to enable the computer to generate the wait-free synchronization construct as including at least one native code instruction configured to enable the computer system to:

A. retrieve a value from a storage location for the variable;
   B. perform a predetermined operation in connection with the value to generate a modified value;
   C. perform an atomic compare-and-swap operation in connection with the value, the modified value and contents of the storage location to compare the value to the contents of the storage location and
      (i) if the value corresponds to the contents of the storage location, store the modified value in the storage location, but
      (ii) if the value does not correspond to the contents of the storage location, update the modified value with the contents of the storage location;
   D. compare the value and the modified value and, if the value and modified value correspond continue, but, if the value and modified value do not correspond, perform a subsequent iteration of the at least one native code instruction.

16. A computer program product as defined in claim 13 in which the program includes instructions in Java Byte Code.

17. A computer program product as defined in claim 13 in which the native code generator module is in the form of a just-in-time compiler.

18. A computer program product as defined in claim 13 in which, if the synchronization statement detector module enables the computer to detect synchronization statements for synchronizing access to a plurality of variables, the native code generator enables generation of a wait-free synchronization construct associated with each of said plurality of variables.

* * * * *